United States Patent [19]

Akahori et al.

[11] Patent Number: 5,463,032
[45] Date of Patent: Oct. 31, 1995

[54] BISAZO COMPOUNDS AND METHOD FOR DYEING OR PRINTING FIBER MATERIALS USING THE SAME

[75] Inventors: Kingo Akahori, Toyonaka; Yoshiteru Ohta, Ibaraki; Takashi Omura, Kobe; Mahito Fujita; Naoki Harada, both of Ibaraki, all of Japan

[73] Assignee: Sumitomo Chemical Company, Limited, Osaka, Japan

[21] Appl. No.: 155,834

[22] Filed: Nov. 23, 1993

[30] Foreign Application Priority Data

Dec. 4, 1992 [JP] Japan ................... 4-350750

[51] Int. Cl.$^6$ ............. C09B 62/513; D06P 1/384
[52] U.S. Cl. ............ 534/642; 534/635; 534/637
[58] Field of Search ................. 534/642, 637

[56] References Cited

U.S. PATENT DOCUMENTS

| | | | |
|---|---|---|---|
| 4,698,421 | 10/1987 | Kayane et al. ............. | 534/642 |
| 5,075,428 | 12/1991 | Jäger et al. ............... | 534/637 |
| 5,306,814 | 4/1994 | Akahori et al. ............ | 534/642 |

FOREIGN PATENT DOCUMENTS

| | | | |
|---|---|---|---|
| 0076782 | 4/1983 | European Pat. Off. . | |
| 0167858 | 1/1986 | European Pat. Off. . | |
| 313513 | 4/1989 | European Pat. Off. | 534/637 |
| 0400647 | 12/1990 | European Pat. Off. . | |
| 61-247759 | 11/1986 | Japan . | |
| 63-105065 | 5/1988 | Japan | 534/642 |
| 2160883 | 1/1986 | United Kingdom . | |

OTHER PUBLICATIONS

Hibara et al, Chemical Abstracts, 106:139820t (1987).
Chemical Abstracts, Chemical Substance Index, vol. 106, Part 3, p. 5232CS, 1987.

*Primary Examiner*—Johann Richter
*Assistant Examiner*—Fiona T. Powers
*Attorney, Agent, or Firm*—Stevens, Davis, Miller & Mosher

[57] ABSTRACT

A bisazo compound represented by the formula (I) in the free acid form,

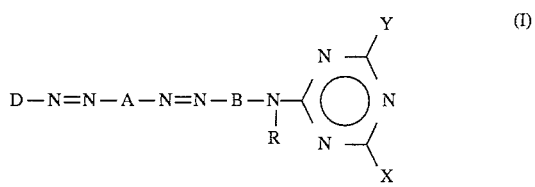

wherein D is unsubstituted or substituted phenyl or naphthyl; A and B are independently unsubstituted or substituted phenylene or naphthylene; R is hydrogen or unsubstituted or substituted lower alkyl; X is aromatic amino residue or aliphatic amino residue; arid Y is a group represented by the formula,

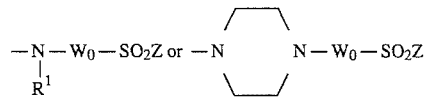

wherein $R^1$ is hydrogen or unsubstituted or substituted alkyl, $W_0$ is unsubstituted or substituted alkylene; and Z is vinyl or —$CH_2CH_2Z_1$, in which $Z_1$ is a group capable of being split by the action of an alkali; is a reactive dye useful for dyeing or printing fiber materials having hydroxy groups and/or amide groups to brown or violet color, and can provide dyed or printed products with superior fastness properties and dyeing properties such as build-up property.

12 Claims, No Drawings

BISAZO COMPOUNDS AND METHOD FOR DYEING OR PRINTING FIBER MATERIALS USING THE SAME

The present invention relates to improved and novel bisazo compounds which are suitable for use in the dyeing and printing of materials containing hydroxyl groups and/or amide groups, particularly cellulose fibers, natural or synthetic polyamide fibers, polyurethane fibers, leathers and mixed fibers containing at least one thereof, to obtain dyed products fast to light and wetness; and the use of the compounds.

Bisazo compounds having a vinyl sulfone reactive group are disclosed, for example, in U.S. Pat. No. 4,698,421 and EP-A-76782. However, they are yet unsatisfactory in dye performance, for example, build-up property and wet-fastness, so that a further improvement has been demanded.

Hitherto, various reactive dyes have widely been used in the field of dyeing and printing of fiber materials. However, the technology level today is still unsatisfactory in view of the fact that high level of dyeing properties is required to dyes and enhanced fastness is required to the products dyed therewith.

The above-mentioned known compounds are insufficient in performing dyeing properties and properties of providing products having high fastness properties with good balance. Therefore, supply of further improved dyes have been strongly desired.

The present inventors have made extensive study to improve the defects of the known dyes and to find novel compounds which can sufficiently satisfy the requirements demanded for dyes. As a result, they accomplished the present invention.

The present invention provides a bisazo compound represented by the formula (I),

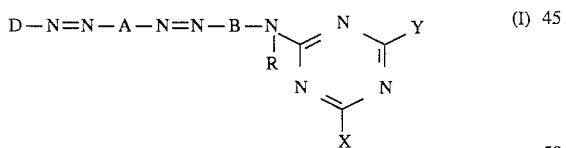 (I)

wherein R is hydrogen or unsubstituted or substituted lower alkyl; D is unsubstituted or substituted phenyl or unsubstituted or substituted naphtyl; A is a group represented by the formula (1) or (2),

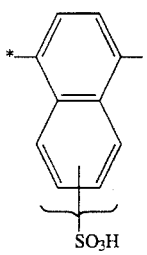 (1)

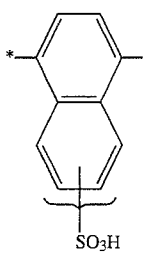 (2)

wherein $R_1$ is hydrogen, $C_1$–$C_4$ alkyl, $C_1$–$C_4$ alkoxy, $C_1$–$C_4$ acylamino or ureido, $R_2$ is hydrogen, $C_1$–$C_4$ alkyl or $C_1$–$C_4$ alkoxy, and the mark * indicates a bond linking to D—N=N—; B is a group represented by the formula (3) or (4),

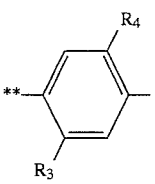 (3)

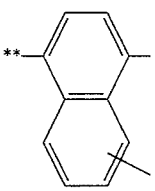 (4)

wherein $R_3$ is hydrogen, $C_1$–$C_4$ alkyl, $C_1$–$C_4$ alkoxy, $C_1$–$C_4$ acylamino or ureido, $R_4$ is hydrogen, $C_1$–$C_4$ alkyl or $C_1$–$C_4$ alkoxy, the mark ** indicates a bond linking to —A—N=N—; Y is a group represented by the formula (5), (6), (7) or (8),

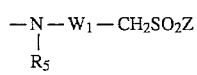 (5)

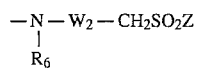 (6)

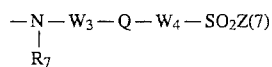 (7)

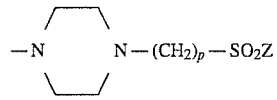 (8)

wherein $R_6$ is hydrogen or unsubstituted or substituted lower alkyl, $W_2$ is linear or branched $C_1$–$C_5$ alkylene unsubstituted or substituted with halogeno, hydroxy, sulfato, carboxy, cyano, $C_1$–$C_4$ alkylcarbonyloxy, $C_1$–$C_4$ alkoxycarbonyl, carbamoyl or —$SO_2Z$, Z is —CH=$CH_2$ or —$CH_2CH_2Z_1$, in which $Z_1$ is a group capable of being split by the action of an alkali, $W_1$ is linear or branched $C_1$–$C_5$ alkylene, $R_5$ is hydrogen, unsubstituted or substituted lower alkyl or —$W_2$—$CH_2SO_2Z$, in which $W_2$ and Z are as defined above, $W_3$ and $W_4$ are independently linear or branched $C_2$–$C_6$ alkylene, $R_7$ is hydrogen or unsubstituted or substituted lower alkyl, Q is —O— or —$NR_8$—, in which $R_8$ is hydrogen or $C_1$–$C_4$ alkyl, and p is an integer of 1–6; and X is a group represented by the formula (9) or (10),

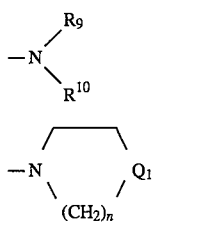

wherein $R_9$ is hydrogen or unsubstituted or substituted alkyl, $R_{10}$ is hydrogen, unsubstituted or substituted alkyl, unsubstituted or substituted phenyl or $C_5$–$C_7$ cycloalkyl, n is 1 or 2, and $Q_1$ is —O—, —S—, —CH$_2$—, —SO$_2$— or —NR$_{11}$—, in which $R_{11}$ is hydrogen or $C_1$–$C_4$ alkyl; with the proviso that at least one of D, A, B and X has sulfo; and a method for dyeing or printing fiber materials which comprises applying thereto the bisazo compound.

In the present invention, when unsubstituted or substituted lower alkyl is selected as each of R, $R_5$, $R_6$ or $R_7$, the lower alkyl is preferably $C_1$–$C_4$ alkyl, and the substituent therefor may be hydroxy, cyano, alkoxy, halogen, carbamoyl, carboxy, alkoxycarbonyl, alkylcarbonyloxy, sulfo or sulfamoyl.

When unsubstituted or substituted lower alkyl is selected as each of R, $R_5$, $R_6$ and $R_7$, the lower alkyl is preferably methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methoxycarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl or 4-sulfamoylbutyl.

In the present invention, R is preferably hydrogen, methyl or ethyl, more preferably hydrogen.

When a group represented by the formula (5) or (6) is selected as Y in the formula (I), the linear or branched $C_1$–$C_5$ alkylene represented by $W_1$ and $W_2$ is preferably methylene, ethylene, methylmethylene, trimethylene or tetramethylene. Of these, methylene and ethylene are particularly preferred. $R_6$ is preferably hydrogen, methyl or ethyl, and particularly preferably hydrogen. $R_5$ is preferably hydrogen, methyl, ethyl, or a group represented by the formula, —$W_2$—CH$_2$SO$_2^Z$, wherein $W_2$ and Z are as defined above. Of these, hydrogen is particularly preferred.

When a group represented by the formula (7) is selected as Y, the linear or branched $C_2$–$C_6$ alkylene represented by $W_3$ and $W_4$ is preferably ethylene, trimethylene or tetramethylene, particularly preferably ethylene. $R_7$ is preferably hydrogen, methyl or ethyl, and particularly preferably hydrogen. Q is preferably —O— or —NH—, particularly preferably —O—.

When a group represented by the formula (8) is selected as Y, p is preferably 2, 3 or 4.

In the formula (I), Y is particularly preferably a group represented by the formula, —NH(CH$_2$)$_m$SO$_2$Z, wherein m is 2 or 3 and Z is as defined above.

In the formula (I), when a group represented by the formula (9) is selected as X, the unsubstituted or substituted alkyl represented by $R_9$ and $R_{10}$ is preferably, for example, $C_1$–$C_4$ alkyl unsubstituted or substituted with $C_1$–$C_4$ alkoxy, sulfo, carboxy, hydroxy or sulfato. Of these, particularly preferable are methyl, ethyl, n-propyl, isopropyl, n-butyl, isobutyl, sec-butyl, β-hydroxyethyl, β-sulfatoethyl, β-sulfoethyl, β-methoxyethyl and β-carboxyethyl.

When unsubstituted or substituted phenyl is selected as $R_{10}$, it is preferably unsubstituted phenyl or phenyl substituted with one or two substituents selected from the group consisting of $C_1$–$C_4$ alkyl, $C_1$–$C_4$ alkoxy, sulfo, carboxy, chloro and bromo. Of these, preferred are phenyl, 2-, 3- or 4-sulfophenyl, 2,4- or 2,5-disulfophenyl, 2-, 3- or 4-carboxyphenyl, 2-, 3- or 4-chlorophenyl, 2-, 3- or 4-methylphenyl, 2-, 3- or 4-methoxyphenyl, 2-carboxy-4- or -5-sulfophenyl, 2-sulfo- 4- or -5-methylphenyl, 2-sulfo-4- or -5-methoxyphenyl, 2-methyl-4- or -5-sulfophenyl and 2-methyoxy-4- or -5-sulfophenyl. When $R_{10}$ is unsubstituted or substituted phenyl, $R_9$ is preferably hydrogen, methyl or ethyl.

In the formula (I), when a group represented by the formula (10) is selected as X, n is preferably 2 and $Q_1$ is preferably —CH$_2$— or —O—.

In the formula (I), when unsubstituted or substituted phenyl is selected as D, it may be unsubstituted phenyl or phenyl substituted with one, two or three substituents selected from the group consisting of $C_1$–$C_4$ alkyl, $C_1$–$C_4$ alkoxy, carboxy, sulfo, halogeno and nitro. Of these, preferred are groups represented by the formula (11),

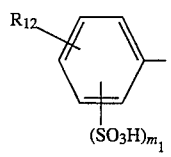

wherein $R_{12}$ is hydrogen, $C_1$–$C_4$ alkyl, $C_1$–$C_4$ alkoxy or carboxy; and $m_1$ is 1 or 2. More preferred are those wherein $R_{12}$ is hydrogen, methyl, methoxy or carboxy.

When unsubstituted or substituted naphthyl is selected as D, it is preferably unsubstituted naphthyl or naphthyl substituted with one, two or three sulfo groups. Of these, preferred are those which are represented by the formula (12),

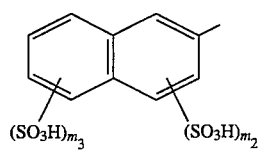

wherein $m_2$ is 0 or 1 and $m_3$ is 1 or 2. Particularly preferred are groups represented by the following formula,

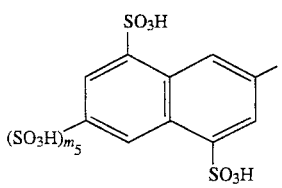

(5)

wherein $m_5$ is 0 or 1.

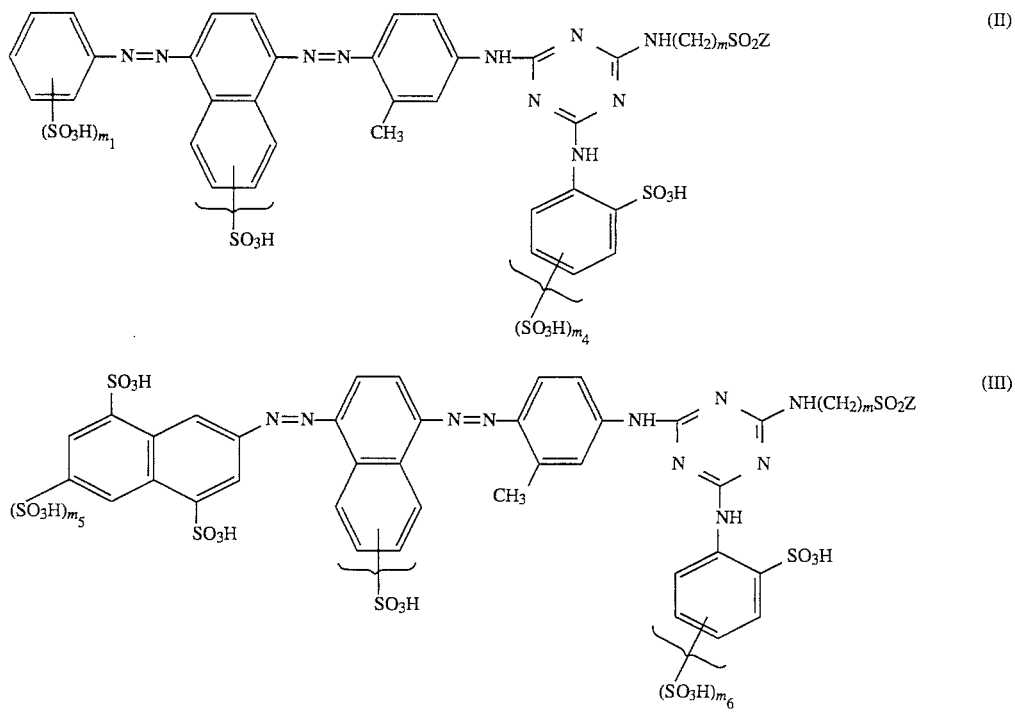

In the formula (I), when a group represented by the formula (1) is selected as A and a group represented by the formula (3) is selected as B, $R_1$ and $R_3$ are each preferably hydrogen, methyl, methoxy, acetylamino or ureido, particularly preferably hydrogen or methyl, and $R_2$ and $R_4$ are each preferably hydrogen, methyl or methoxy, particularly preferably hydrogen.

In the present invention, A is preferably a group represented by the formula (2). B is preferably represented by either the formula (3) or the following formula,

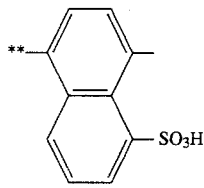

wherein the mark ** is as defined above. Of these, particularly preferred is the group represented by the formula (3).

When a group represented by the formula (3) is selected as B, the group wherein $R_3$ is hydrogen or methyl and $R_4$ is hydrogen is preferred.

In the present invention, bisazo compounds represented by the formula (II) or (III) in the free acid form are preferable:

wherein $m_4$ and $m_6$ are independently 0 or 1, and $m_1$, $m$, $m_5$ and Z are as defined above.

The group represented by $Z_1$ capable of being split by the action of an alkali includes, for example, sulfuric ester, thiosulfuric ester, phosphoric ester, acetic ester, halogen, and the like. Of these, chloro or sulfuric ester is preferred.

Z is preferably $-CH=CH_2$, $-CH_2CH_2Cl$ or $-CH_2CH_2OSO_3H$.

The compound of the present invention may be in the form of free acid or a salt thereof, preferably in the form of an alkali metal salt or an alkaline earth metal salt, and particularly preferably in the form of sodium salt, potassium salt or lithium salt.

The compound of the present invention can be produced, for example, in the following manner. A compound represented by the following formula (IV),

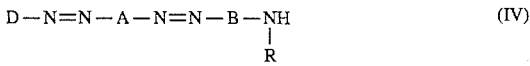

wherein D, A, B and R are as defined above, a compound represented by the following formula (V),

wherein Y is as defined above, and a compound represented by the following formula (VI), $$X-H \qquad (VI)$$

wherein X is as defined above, are subjected respectively to condensation reactions, in an optional order, with 2,4,6-trihalogeno-s-triazine to obtain the compound of the formula (I).

In the condensation reactions between the 2,4,6-trihalogeno-s-triazine and the compounds (IV), (V) and (VI), the order of the reaction is not critical. The reaction conditions are also not critical, but the condensation is preferably carried out primarily at a temperature of $-10°$ to $+40°$ C. at a pH of 2 to 9, secondarily at a temperature of $0°$ to $70°$ C. at a pH of 2 to 9, and tertiarily at a temperature of $10°$ to $100°$ C. at a pH of 2 to 7, whereby the bisazo compound represented by the formula (I) or a salt thereof can be obtained.

The compound represented by the formula (IV) may be synthesized by known methods. For example, a compound represented by the formula (VII), $$D-NH_2 \qquad (VII)$$

wherein D is as defined above, is diazotized; the resulting product is subjected to diazo coupling with a compound represented by the formula (VIII), $$A-NH_2 \qquad (VIII)$$

wherein A is as defined above; the resulting monoazo compound is diazotized; and the resulting compound is subjected to diazo coupling with a compound represented by the formula (IX), $$\begin{array}{c} B-NH \\ | \\ R \end{array} \qquad (IX)$$

wherein B and R are as defined above, to obtain the compound of the formula (IV).

The 2,4,6-trihalogeno-s-triazine is preferably cyanuric chloride or cyanuric fluoride.

Specific examples of the compound represented by the formula (VII) are 2-, 3- or 4-sulfoaniline, 2,4- or 2,5-disulfoaniline, 2-carboxy-4- or -5-sulfoaniline, 2-sulfo-4-methoxyaniline, 2-sulfo-4-methylaniline, 2-aminonaphthalene-4,8-disulfonic acid, 2-aminonaphthalene-3,6-disulfonic acid, 2-aminonaphthalene-6,8-disulfonic acid, 2-aminonaphthalene-3,7-disulfonic acid, 2-aminonaphthalene-4,7-disulfonic acid, 2-aminonaphthalene-5,7-disulfonic acid, 2-aminonaphthalene-4,6,8-trisulfonic acid and 2-aminonaphthalene-3,6,8-trisulfonic acid. Of these, particularly preferred are 2-, 3- or 4-sulfoaniline, 2,4- or 2,5-disulfoaniline, 2-aminonaphthalene-4,8-disulfonic acid, 2-aminonaphthalene-4,6,8-trisulfonic acid, and the like.

The compound represented by the formula (VIII) or (IX) may be, for example, 1-aminonaphthalene-6-, -7- or -8-sulfonic acid, aniline, o-toluidine, m-toluidine, m-ethylaniline, 2,5-dimethylaniline, 2,5-diethylaniline, o-methoxyaniline, o-ethoxyaniline, m-methoxyaniline, m-ethoxyaniline, 2,5-dimethoxyaniline, 2-methoxy-5-methylaniline, 2-ethoxy-5-methylaniline, m-acetylaminoaniline, m-propionylaminoaniline, m-butyrylaminoaniline, 2-methyl-5-acetylaminoaniline, 2-methoxy-5-acetylaminoaniline, 2-ethoxy-5-acetylaminoaniline, m-ureidoaniline, and the like.

The compound represented by the formula (V) may be, for example, $H_2NC_2H_4SO_2CH=CH_2$, $H_2NC_2H_4SO_2C_2H_4Cl$,
$H_2NC_2H_4SO_2C_2H_4OSO_3H$, $H_2NC_3H_6SO_2CH=CH_2$,
$H_2NC_3H_6SO_2C_2H_4Cl$, $H_2NC_3H_6SO_2C_2H_4OSO_3H$,
$H_2NC_4H_8SO_2CH=CH_2$, $H_2NC_4H_8SO_2C_2H_4Cl$,
$H_2NC_4H_8SO_2C_2H_4OSO_3H$, $HN(C_2H_4SO_2CH=CH_2)_2$,
$HN(C_2H_4SO_2C_2H_4Cl)_2$, $HN(C_2H_4SO_2C_2H_4OSO_3H)_2$, $$\underset{\underset{HNC_2H_4SO_2CH=CH_2,}{|}}{CH_3} \quad \underset{\underset{HNC_2H_4SO_2C_2H_4Cl,}{|}}{C_2H_5}$$

$H_2NC_2H_4NHC_2H_4SO_2CH=CH_2$,
$H_2NC_2H_4NHC_2H_4SO_2C_2H_4Cl$,
$H_2NC_2H_4NHC_2H_4SO_2C_2H_4OSO_3H$, $$\underset{\underset{SO_2C_2H_4Cl,}{|}}{H_2NCH_2CHC_2H_4SO_2C_2H_4Cl}$$

$$\underset{\underset{SO_2CH=CH_2,}{|}}{H_2NCH_2CHC_2H_4SO_2CH=CH_2}$$

$$\underset{\underset{SO_2C_2H_4Cl,}{|}}{H_2NCH_2CHC_3H_6SO_2C_2H_4Cl}$$

$HN\diagup\diagdown N-C_2H_4SO_2CH=CH_2$,

$HN\diagup\diagdown N-C_2H_4SO_2C_2H_4Cl$, $HN\diagup\diagdown N-C_2H_4SO_2C_2H_4OSO_3H$, $HN\diagup\diagdown N-C_3H_6SO_2CH=CH_2$,

$HN\diagup\diagdown N-C_3H_6SO_2C_2H_4Cl$, $HN\diagup\diagdown N-C_3H_6SO_2C_2H_4OSO_3H$, $H_2NC_2H_4OC_2H_4SO_2C_2H_4OSO_3H$,
$H_2NC_2H_4OC_2H_4SO_2CH=CH_2$,
$H_2NC_2H_4OC_2H_4SO_2C_2H_4Cl$,
$H_2NC_3H_6OC_3H_6SO_2CH=CH_2$,
$H_2NC_3H_6OC_4H_8SO_2C_2H_4Cl$,
$H_2NC_2H_4OC_3H_6SO_2C_2H_4OSO_3H$, and the like.

The compound represented by the formula (VI) may include, for example, ammonia and amines such as 1-aminobenzene, 1-amino-2-, -3- or -4-methylbenzene, 1-amino-3,4- or -3-5-dimethylbenzene, 1-amino-2-, -3- or -4-ethylbenzene, 1-amino-2-, -3- or -4-methoxybenzene, 1-amino-2-, -3- or -4-ethoxybenzene, 1-mino-2-, -3- or -4-chlorobenzene, 3- or 4-aminophenylmethanesulfonic acid, 2-, 3- or 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,3-disulfonic acid, 6-aminobenzene-1,4-disulfonic acid, 4-aminobenzene-1,2-disulfonic acid, 4-amino-5-methylbenzene-1,2-disulfonic acid, 2-, 3- or 4-aminobenzoic acid, 5-aminobenzene-1,3-dicarboxylic acid, 5-amino-2-hydroxybenzenesulfonic acid, 4-amino-2hydroxybenzenesulfonic acid, 5-amino-2-ethoxybenzenesulfonic acid, N-methylaminobenzene, N-ethylaminobenzene, 1-methylamino-3- or -4-methylbenzene, 1-ethylamino-4-chlorobenzene, 1-ethylamino-3- or -4 -methylbenzene, 1-(2-hydroxyethyl)amino-3-methylbenzene, 3- or 4-methylaminobenzoic acid, 3- or 4-methylaminobenzenesulfonic acid, 4-amino-3-carboxybenzenesulfonic acid, 3-amino-4-carboxybenzenesulfonic acid, 2-amino-4-methylbenzenesulfonic acid, 2-amino-5-methylbenzenesulfonic acid, 2-amino-4-methoxybenzenesulfonic acid, 2 -amino-5-methoxybenzenesulfcnic acid, 3-amino-4-methoxybenzenesulfonic acid, 4-amino-3-methoxybenzenesulfonic acid, 3-amino-4-methylbenzenesulfonic acid, 4-amino-3-methylbenzenesulfonic acid, morpholine, piperidine, pyrrolidine, cyclohexylamine, cyclopentylamine, methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, ε-aminocaproic acid, benzylamine, 2-, 3- or 4-chlorobenzylamine, bis(2-sulfatoethyl)amine, 4-methylbenzylamine, N-methylbenzylamine, 2-, 3- or 4-sulfobenzylamine, 2-phenylethylamine, 1-phenylethylamine and 1-phenyl-2-propylamine.

The compound of the present invention is fiber-reactive and can be used for dyeing or printing hydroxy group- or carbonamide group-containing materials. The material to be dyed or printed is preferably used in the form of a fiber material or a mixed fiber material thereof.

The hydroxy group-containing material includes natural or synthetic hydroxy group-containing materials, e.g., cellulose fiber materials, their regenerated products and polyvinyl alcohol. The cellulose fiber materials are preferably cotton and other plant fibers, such as linen, flax, hemp, jute and ramie fibers. The regenerated cellulose fibers can be, for example, viscose rayon staple and viscose rayon filament.

Specific examples of the carbonamide group-containing material are synthetic and natural polyamides and polyurethane, and particularly those in the form of fiber, e.g. wool and other animal furs, silk, leather, polyamide-6,6, polyamide-6, polyamide-11 and polyamide-4.

The compound of the present invention can be used for dyeing or printing the above materials, particularly the fiber materials, in an appropriate manner selected by considering the physical and chemical properties of the materials.

For example, cellulose fibers can be subjected to exhaustion dyeing with the compound of the present invention at a relatively low temperature in the presence of an acid binding agent (e.g. sodium carbonate, sodium tertiary phosphate or sodium hydroxide), with optional use of a neutral salt (e.g. sodium sulfate or sodium chloride) and with occasional use of a dissolving assistant, a penetrant or a level dyeing agent. The neutral salt, which promotes the exhaustion of dye, may be added after the bath temperature has reached the dyeing temperature or before it reaches the dyeing temperature. Alternatively, the neutral salt may be added before the bath temperature reaches the dyeing temperature and after it has reached the dyeing temperature in portions.

Cellulose fibers can be also dyed with the compound of the present invention by a padding method. In this case, cellulose fibers are padded at a room temperature or elevated temperatures, dried and then subjected to steaming or dry heating to effect dye fixation.

Cellulose fibers can also be printed with the compound of the present invention. Printing of cellulose fibers can be carried out, for example, in one-phase by printing the cellulose fibers with a printing paste containing the compound of the present invention and an acid binding agent such as sodium bicarbonate, and steaming the printed cellulose fibers at 95° to 160° C. Alternatively, printing of cellulose fibers can also be conducted in two-phase by printing the cellulose fibers with a neutral or weakly acidic printing paste containing the compound of the present invention, either passing the printed cellulose fibers through a hot alkaline bath containing an electrolyte or over-padding the printed cellulose fibers with an alkaline padding liquor containing an electrolyte, and carrying out steaming or dry-heating treatments.

For preparation of the printing paste, a thickner or emulsifier, such as sodium alginate or starch ether, is used; and a conventional printing assistant, such as urea, and/or a dispersant may optionally be used incorporated therein.

Acid binding agents suitable for fixing the compound of the present invention onto cellulose fibers include water-soluble basic salts formed between an alkali or alkaline earth metal and an inorganic or organic acid, or a compound which liberates alkali in a heated state. Preferred are alkali metal hydroxides and alkali metal salts of inorganic or organic acids of weak or medium strength. Of these, sodium compounds and potassium compounds are particularly preferred. Specific examples of such acid binding agents are sodium hydroxide, potassium hydroxide, sodium bicarbonate, sodium carbonate, sodium formate, potassium carbonate, sodium primary, secondary and tertiary phosphates, sodium silicate, sodium trichloroacetate, and the like.

Synthetic and natural polyamide and polyurethane fibers also can be dyed with the compound of the present invention. Dyeing of these fibers can be carried out by performing exhaustion in an acidic or weakly acidic bath at a controlled pH value and then neutralizing the bath or, in some cases alkalifying the bath, to effect the fixation. The dyeing can be carried out usually at a temperature of 60° to 120° C. In order to achieve the level dyeing, there may be used a conventional level dyeing agent, such as a condensation product between cyanuric chloride and 3 times by mole of either aminobenzenesulfonic acid or aminonaphthalenesulfonic acid, or an addition product between stearylamine and ethylene oxide.

The compound of the present invention is characterized in that it exhibits excellent performances in dyeing and printing fiber materials. It is especially useful for dyeing cellulose fiber materials and gives a dyed product excellent in light fastness, perspiration-light fastness, wet fastness, such as washing resistance, peroxide-washing resistance, perspiration resistance, acid hydrolysis resistance and alkali resistance, and besides, in chlorine fastness, abrasion fastness and iron fastness.

The compound is further characterized by excellent build-up, level-dyeing and washing-off properties, high solubility as well as high exhaustion and fixation percentages. Moreover, it is characterized in that it is hardly affected by changes in dyeing temperature, the amount of neutral salts or acid binding agents and the dyeing bath ratio, so that a dyed product with a stable quality can be obtained.

Furthermore, the compound of the present invention is characterized in that the dyed product obtained therefrom is resistant to color change at the time of fixing treatment or resin finishing and resistant to the change due to contact with basic substances during storage.

Further, the compound of the present invention exhibits excellent build-up property and excellent alkali resistance in cold batch-up dyeing. It shows virtually no difference in concentration and hue between fixation at low temperature and that at 25° C., and is hardly hydrolyzed by an alkaline agent.

The compound of the present invention can be used, if necessary, in admixture with other dyes to obtain an intended hue. The dyes to be used in admixture are not particularly limited and may be any reactive dyes known in the art. Preferred examples of the dye include dyes which have as a reactive group at least one group selected from a sulfatoethylsulfone group, a vinylsulfone group, a monochlorotriazine group, a monofluorotriazine group, a mononicotinic triazine group, a dichlorotriazine group, a difluoromonochloropyrimidine group and a trichlorpyrimidine group, dyes commercially available under the trade names of Sumifix, Sumifix Supra, Remazol, Levafix, Procion, Cibacron, Basilen, Drimarene, Kayacion and Kayacelon React, and dyes disclosed in JP-A-50-178, JP-A-56-9483 (=EP-A- 22265), JP-A-56-15481 (=EP-A-21105), JP-A-56-118976 (=EP-A-35171), JP-A-56-128380, JP-A-57-2365 (=EP-A 42108), JP-A-57-89679 (=EP-A-52985), JP-A-57-143360 (=EP-A-56975), JP-A-59-15451 (=EP-A-99721), JP-A-58- 191755, JP-A-59-96174, JP-A-59-161463, JP-A-60-6754, JP -A-60-123559, JP-A-60-229957 (=GB-A-2160883), JP-A-60- 260654, JP-A-61-155469 (=EP-A-184071), JP-A-63-77974 (=EP-A-239847), JP-A-63-225665 (=EP-A-264878), JP-A-1- 185370 (=EP-A-325246) and JP-A-3-770 (=EP-A-385210).

The present invention will be described in more detail below with reference to the following examples, which are

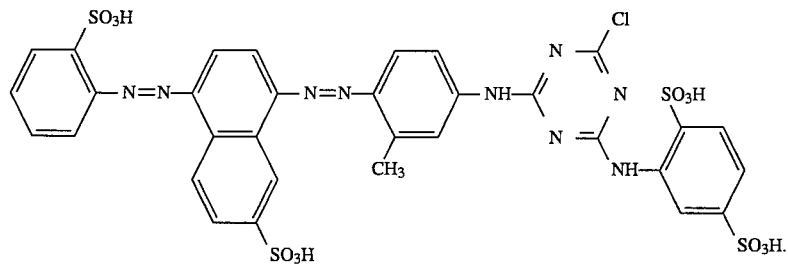

only illustrative but not limitative to the scope of the invention. All parts and % in the examples are by weight.

EXAMPLE 1

25.3 Parts of 2-aminobenzene-1,4-disulfonic acid and 18.5 parts of cyanuric chloride were condensed under an acidic condition in an aqueous medium by a conventional manner to obtain a condensate. Then, the condensate was condensed with 52.5 parts of a bisazo compound synthesized by a conventional manner and represented by the following formula in the free acid form:

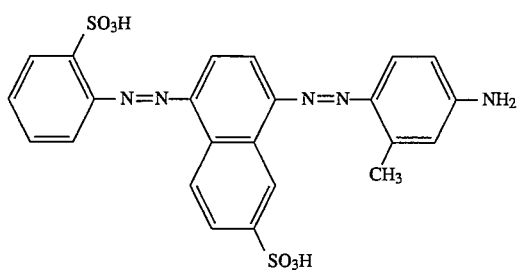

to obtain a compound represented by the following formula in the free acid form:

The compound thus obtained was condensed with 24.7 parts of γ-(β-sulfatoethylsulfonyl)propylamine in an aqueous medium at a pH of 3–6 and at a temperature of 60°–80° C. to obtain a bisazo compound represented by the following formula in the free acid form:

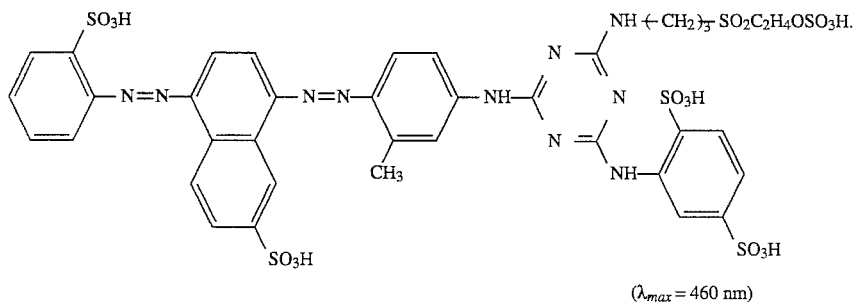

($\lambda_{max}$ = 460 nm)

EXAMPLE 2

The same procedure as in Example 1 was repeated except that the bisazo compound, 2-aminobenzene -1,4-disulfonic acid and γ-(β-sulfatoethylsulfonyl)propylamine used in Example 1 were replaced with the compounds of columns 2, 3 and 4 of Table 1, respectively, to obtain corresponding bisazo compounds. Dyeing a fiber material with each of the thus obtained bisazo compounds gave dyed products having hues shown in column 5 of Table 1.

TABLE 1

| 1 | 2 | 3 | 4 | 5 |
|---|---|---|---|---|
| 1 | ![structure: 2,5-disulfo phenyl-N=N-naphthalene(SO3H)-N=N-(3-methyl-4-amino phenyl)] | ![structure: 2-amino-1,4-disulfo benzene] | H$_2$NC$_2$H$_4$SO$_2$C$_2$H$_4$OSO$_3$H | Brown |
| 2 | " | " | H$_2$NC$_2$H$_4$SO$_2$C$_2$H$_4$Cl | " |
| 3 | " | " | H$_2$NC$_2$H$_4$SO$_2$CH=CH$_2$ | " |
| 4 | " | " | H$_2$N(CH$_2$)$_3$SO$_2$C$_2$H$_4$OSO$_3$H | " |
| 5 | ![same structure as 1] | ![same structure as 1] | H$_2$N(CH$_2$)$_3$SO$_2$C$_2$H$_4$Cl | Brown |
| 6 | " | " | H$_2$N(CH$_2$)$_3$SO$_2$CH=CH$_2$ | " |
| 7 | " | ![structure: 4-amino-2-sulfo-... with HO$_3$S and SO$_3$H, NH$_2$] | H$_2$NC$_2$H$_4$SO$_2$C$_2$H$_4$OSO$_3$H | " |
| 8 | " | " | HN(C$_2$H$_4$SO$_2$C$_2$H$_4$OSO$_3$H)(C$_2$H$_5$) | " |

TABLE 1-continued

| 1 | 2 | 3 | 4 | 5 |
|---|---|---|---|---|
| 9 | ![structure: SO3H-phenyl-N=N-naphthalene(SO3H)-N=N-phenyl(CH3)(NH2), with SO3H on phenyl] | ![structure: HO3S-phenyl(SO3H)(NH2)] | $H_2NC_2H_4SO_2CH=CH_2$ | Brown |
| 10 | " | " | $H_2N{\leftarrow}CH_2{\rightarrow}_7SO_2C_2H_4OSO_3H$ | " |
| 11 | " | " | $\begin{array}{c}CH_2CH_2SO_2CH_2CH_2OSO_3H\\|\\H_2N-CH\\|\\CH_2CH_2OSO_3H\end{array}$ | " |
| 12 | " | " | $H_2N{\leftarrow}CH_2{\rightarrow}_7SO_2CH=CH_2$ | " |
| 13 | ![structure: same as row 9] | ![structure: phenyl with SO3H, NH2, SO3H] | $H_2NC_2H_4SO_2C_2H_4OSO_3H$ | Brown |
| 14 | " | " | $H_2NC_2H_4SO_2C_2H_4Cl$ | " |
| 15 | " | " | $H_2NC_2H_4SO_2CH=CH_2$ | " |

TABLE 1-continued

| 1 | 2 | 3 | 4 | 5 |
|---|---|---|---|---|
| 16 | ![structure: 2,5-disulfophenyl-N=N-naphthalene(SO3H)-N=N-(3-methyl-4-aminophenyl)] | ![structure: 2-amino-1,4-disulfobenzene] | H₂NC₂H₄SO₂C₂H₄OSO₃H | Brown |
| 17 | ![structure: same as above] | ![structure: 4-(N-ethylamino)benzenesulfonic acid, HO₃S-C₆H₄-NHC₂H₅] | H₂NC₂H₄SO₂C₂H₄Cl | " |
| 18 | " | H₂NC₂H₄SO₃H | H₂NC₂H₄SO₂C₂H₄OSO₃H | " |
| 19 | ![structure: 2,5-disulfophenyl-N=N-naphthalene(SO3H)-N=N-(3-methyl-4-aminophenyl)] | | H₂NC₂H₄SO₂C₂H₄Cl | " |
| 20 | " | " | H₂NC₂H₄SO₂CH=CH₂ | " |
| 21 | " | " | | |

TABLE 1-continued

| 1 | 2 | 3 | 4 | 5 |
|---|---|---|---|---|
| 22 | ![structure: naphthalene with SO₃H, NH₂, SO₃H, N=N linkage to naphthalene with SO₃H groups] | ![3-amino-benzene-1,4-disulfonic acid structure] | $H_2NCH_2CH_2SO_2CH_2CH_2OSO_3H$ | Violet |
| 23 | " | ![2-aminobenzenesulfonic acid] | $H_2NCH_2CH_2SO_2CH=CH_2$ | " |
| 24 | " | " | " | " |
| 25 | ![structure: 4-amino-2-methylphenyl azo naphthalene disulfonic acid] | " | $H_2NCH_2CH_2SO_2CH_2CH_2OSO_3H$ | " |
| 26 | " | ![3-amino-benzene-1,4-disulfonic acid] | $H_2NCH_2CH_2SO_2CH_2CH_2OSO_3H$ | Brown |
| 27 | " | " | $H_2N\text{-}(CH_2)_3\text{-}SO_2CH_2CH_2OSO_3H$ | " |
| 28 | ![structure: 4-amino-2-methylphenyl azo naphthalene mono-SO₃H with phenyl-SO₃H azo] | " | $H_2NC_2H_4SO_2C_2H_4OSO_3H$ | " |

TABLE 1-continued
| 1 | 2 | 3 | 4 | 5 |
|---|---|---|---|---|
| 29 | " | |  | " |
| 30 | |  | $H_2NC_2H_4SO_2CH=CH_2$ | Brown |
| 31 | | | " | |
| 32 | " " |  | $H_2NC_2H_4SO_2C_2H_4OSO_3H$ | " " |
| 33 | | | $H_2NC_2H_4SO_2C_2H_4Cl$ | |
| 34 | | | $H_2NC_2H_4SO_2C_2H_4OSO_3H$ | Brown |
| 35 | " " | | $H_2NC_2H_4SO_2CH=CH_2$ | " " |
| 36 | | | $H_2NC_2H_4SO_2C_2H_4Cl$ | |

TABLE 1-continued

| 1 | 2 | 3 | 4 | 5 |
|---|---|---|---|---|
| 37 | ![structure: 2,5-disulfophenyl-N=N-naphthalene(SO3H)-N=N-(2-methyl-4-amino)phenyl] | ![structure: 2-sulfoaniline] | " | " |
| 38 | ![structure: 2,5-disulfophenyl-N=N-naphthalene(SO3H)-N=N-(2-methyl-4-amino)phenyl] | ![structure: 2-sulfoaniline] | $H_2NC_2H_4SO_2C_2H_4OSO_3H$ | Brown |
| 39 | " | " | $H_2NC_2H_4SO_2CH=CH_2$ | " |
| 40 | " | ![structure: 2,5-disulfoaniline] | $H_2NC_2H_4OC_2H_4SO_2C_2H_4Cl$ | " |
| 41 | " | " | $H_2NC_2H_4OC_2H_4SO_2CH=CH_2$ | " |

TABLE 1-continued

| 1 | 2 | 3 | 4 | 5 |
|---|---|---|---|---|
| 42 | 4-amino-3-methylphenyl azo / 2,5-disulfo phenyl azo naphthalene-7-sulfonic acid | 2-amino-1,4-disulfo benzene | NH$-$(C$_2$H$_4$SO$_2$C$_2$H$_4$OSO$_3$H)$_2$ | Brown |
| 43 | " | " | NH$-$(C$_2$H$_4$SO$_2$CH=CH$_2$)$_2$ | " |
| 44 | " | " | NH$-$(C$_2$H$_4$SO$_2$C$_2$H$_4$Cl)$_2$ | " |
| 45 | " | " | H$_2$NC$_2$H$_4$OC$_2$H$_4$SO$_2$C$_2$H$_4$Cl | " |
| 46 | 4-amino-3-methylphenyl azo / 2,5-disulfo phenyl azo naphthalene-7-sulfonic acid | 4-amino-2,5-disulfo benzene | H$_2$N$-$(CH$_2$)$_3$$-$SO$_2$C$_2$H$_4$OSO$_3$H | Brown |
| 47 | " | " | H$_2$N$-$(CH$_2$)$_3$SO$_2$C$_2$H$_4$Cl | " |
| 48 | " | " | H$_2$N$-$(CH$_2$)$_3$SO$_2$CH=CH$_2$ | " |

| 1 | 2 | 3 | 4 | 5 |
|---|---|---|---|---|
| 49 | [structure: SO₃H-phenyl-N=N-naphthalene(SO₃H)-N=N-phenyl(CH₃)(NH₂), SO₃H] | " | " | " |
| 50 | [structure: SO₃H-phenyl-N=N-naphthalene(SO₃H)-N=N-phenyl(CH₃)(NH₂), SO₃H] | [structure: SO₃H, NH₂, SO₃H phenyl] | $H_2N\text{-}(CH_2)_3\text{-}SO_2C_2H_4OSO_3H$ | Brown |
| 51 | " | " | $H_2N\text{-}(CH_2)_3\text{-}SO_2C_2H_4OSO_3H$ | " |
| 52 | [structure: SO₃H-naphthalene(SO₃H)(SO₃H)-N=N-phenyl(OCH₃)(NHCOCH₃)-N=N-phenyl(OCH₃)(NHCOCH₃)(NH₂)] | " | $H_2NC_2H_4SO_2CH=CH_2$ | " |
| 53 | [structure: SO₃H-phenyl-N=N-naphthalene(SO₃H)-N=N-phenyl(CH₃)(NHC₂H₅)(NH₂), SO₃H] | [morpholine: NH-O ring] | $H_2NCH_2CH\begin{array}{c}CH_2CH_2SO_2CH_2CH_2CH_2OSO_3H\\CH_2CH_2OSO_3H\end{array}$ | " |

Dyeing Example 1

0.3 Part of each of the bisazo compounds obtained in Examples 1 and 2 was dissolved in 200 parts of water. To the resulting solution were added 20 parts of sodium sulfate and then 10 parts of cotton. Thereafter, the temperature of the solution was elevated to 50° C. 30 Minutes later, 4 parts of sodium carbonate was added to the thus heated solution and dyeing was carried out for additional one hour at the same temperature. After completion of dyeing, the dyed cotton was washed with water and soaped to obtain a densely dyed product having, depending upon the bisazo compound used, brown color or violet color. The dyed product was excellent in fastness properties, especially chlorine fastness, light fastness and perspiration-light fastness, and in build-up property.

Dyeing Example 2

0.3 Part of each of the bisazo compounds obtained in Examples 1 and 2 was dissolved in 300 parts of water. To the resulting solution were added 30 parts of sodium sulfate and then 10 parts of cotton. Thereafter, the temperature of the solution was elevated to 60° C. 20 Minutes later, 5 parts of sodium carbonate was added to the thus heated solution and dyeing was carried out for additional one hour at the same temperature. After completion of dyeing, the dyed cotton was washed with water and soaped to obtain a densely dyed product having, depending upon the bisazo compound used, brown color or violet color. The dyed product was excellent in fastness properties, especially light fastness and perspiration-light fastness, and in build-up property.

Dyeing Example 3

A mercerized cotton broad fabric was printed with the color paste having the following composition.

Composition of color paste

| | |
|---|---|
| Each of the bisazo compounds obtained in Examples 1 and 2 | 5 parts |
| Urea | 5 parts |
| Sodium alginate (5%) stock paste | 50 parts |
| Hot water | 25 parts |
| Sodium bicarbonate | 2 parts |
| Water (balance) | 13 parts |

After intermediate drying, the printed cotton broad fabric was steamed at 100° C. for 5 minutes, washed with hot water, soaped, washed with water and dried.

The printed products thus obtained had brown or violet color, depending upon the bisazo compound used, and were high in fixation percentages, excellent in fastness properties, especially light fastness and perspiration-light fastness, and excellent in build-up property.

Dyeing Example 4

25 Parts of each of the bisazo compounds obtained in Examples 1 and 2 was dissolved in hot water. Then, the resulting solution was cooled to 25° C. To the cooled solution were added 5.5 parts of a 32.5% aqueous sodium hydroxide solution and 150 parts of water glass of 50 Baumé degree. Water was further added thereto at 25° C. so as to make the total amount 1,000 parts. Immediately thereafter, a cotton woven fabric was subjected to padding in the resultant liquor as a pad bath. Then, the fabric was taken up and wrapped with a polyethylene film. The thus wrapped cotton woven fabric was stored in a room at 20° C.

Another cotton woven fabric was subjected to padding, taken up and wrapped with a polyethylene film in the same manner as above, and stored in a room at 5° C. These padded fabrics were allowed to stand for 20 hours. Thereafter, they were washed with cold water and then hot water. Then, they were soaped in a boiling detergent, further washed with cold water and dried.

The dyed products allowed to stand at 20° C. for 20 hours and the dyed products allowed to stand at 5° C. for 20 hours were examined for differences in hue and density. Substantially no differences were recognized. Furthermore, dyed products of excellent build-up property were obtained by the cold batch-up dyeing.

Dyeing Examples 5

25 Parts of each of the bisazo compounds obtained in Examples 1 and 2 was dissolved in hot water. Then, the resulting solution was cooled to 25° C. To the cooled solution were added 10 parts of a 32.5% aqueous sodium hydroxide solution and 30 parts of anhydrous sodium sulfate. Water was further added thereto at 25° C. so as to make the total amount 1,000 parts. Immediately thereafter, a viscose rayon woven fabric was subjected to padding in the resultant liquor as a pad bath. Then, the fabric was taken up and wrapped with a polyethylene film. The thus wrapped viscose rayon woven fabric was stored in a room at 20° C.

Another viscose rayon woven fabric was subjected to padding, taken up and wrapped with a polyethylene film in the same manner as above, and stored in a room at 5° C.

These padded fabrics were allowed to stand for 20 hours. Thereafter, they were washed with cold water and then hot water. Then, they were soaped in a boiling detergent, further washed with cold water and dried.

The dyed products allowed to stand at 20° C. for 20 hours and the dyed products allowed to stand at 5° C. for 20 hours were examined for differences in hue and density. Substantially no differences were recognized.

Dyeing Example 6

The same procedure as in Dyeing Example 2 was repeated except that the amount of sodium carbonate used was changed from 5 parts to 3 parts. Dyed products having the same quality as in Dyeing Example 2 were obtained with the respective bisazo compounds used.

Dyeing Example 7

The same procedure as in Dyeing Example 2 was repeated except that the dyeing temperature was changed from 60° C. to 50° C., to obtain dyed products having the same quality as in Dyeing Example 2 with the respective bisazo compounds used. The same results were obtained also when the temperature was 70° C.

Dyeing Example 8

The same procedure as in Dyeing Example 2 was repeated except that the amount of sodium sulfate used was changed from 30 parts to 15 parts, to obtain dyed products having the same quality as in Dyeing Example 2 with the respective bisazo compounds used.

What is claimed is:

1. A bisazo compound represented by the formula (I),

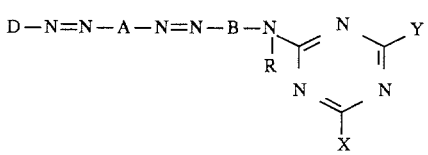  (1)

wherein R is hydrogen or unsubstituted or substituted lower alkyl; D is unsubstituted or substituted phenyl or unsubstituted or substituted naphthyl; A is a group represented by the formula (2),

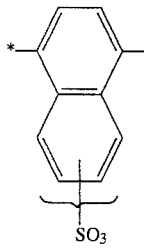  (2)

wherein the mark * indicates a bond linking to D—N=N—; B is a group represented by the formula (3) or (4),

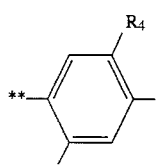  (3)

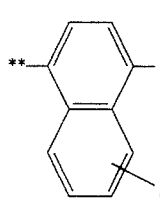  (4)

wherein $R_3$ is hydrogen, $C_1$–$C_4$ alkyl, $C_1$–$C_4$ alkoxy, $C_1$–$C_4$ acylamino or ureido, $R_4$ is hydrogen, $C_1$–$C_4$ alkyl or $C_1$–$C_4$ alkoxy, and the mark ** indicates a bond linking to —A—N=N—; Y is a group represented by the formula (5), (6), (7) or (8),

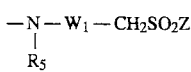  (5)

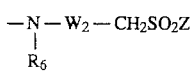  (6)

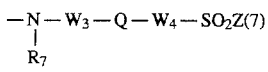  (7)

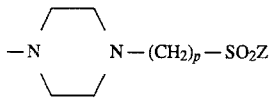  (8)

wherein $R_6$ is hydrogen or unsubstituted or substituted lower alkyl, $W_2$ is linear or branched $C_1$–$C_5$ alkylene unsubstituted or substituted with halogeno, hydroxy, sulfato, carboxy, cyano, $C_1$–$C_4$ alkylcarbonyloxy, $C_1$–$C_4$ alkoxycarbonyl, carbamoyl or —$SO_2Z$, Z is —CH=$CH_2$ or —$CH_2CH_2Z_1$, in which $Z_1$ is a group capable of being split by the action of an alkali, $W_1$ is linear or branched $C_1$–$C_5$ alkylene, $R_5$ is hydrogen, unsubstituted or substituted lower alkyl or —$W_2$—$CH_2SO_2Z$, in which $W_2$ and Z are as defined above, $W_3$ and $W_4$ are independently linear or branched $C_2$–$C_6$ alkylene, $R_7$ is hydrogen or unsubstituted or substituted lower alkyl, Q is —O— or —$NR_8$—, in which $R_8$ is hydrogen or $C_1$–$C_4$ alkyl, and p is an integer of 1–6; and X is a group represented by the formula (9) or (10),

  (9)

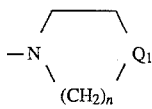  (10)

wherein $R_9$ is hydrogen or alkyl unsubstituted or substituted with $C_1$–$C_4$ alkoxy, sulfo, carboxy, hydroxy or sulfato, $R_{10}$ is hydrogen, alkyl unsubstituted or substituted with $C_1$–$C_4$ alkoxy, sulfo, carboxy, hydroxy or sulfato, unsubstituted or substituted phenyl or $C_5$–$C_7$ cycloalkyl, n is 1 or 2, and $Q_1$ is —O—, —S—, —$CH_2$—, —$SO_2$— or $NR_{11}$—, in which $R_{11}$ is hydrogen or $C_1$–$C_4$ alkyl; with the proviso that at least one of D, A, B and X has sulfo.

2. The compound according to claim 1, wherein D is a group represented by the formula (11) or (12) in the free acid form,

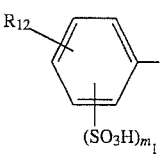  (11)

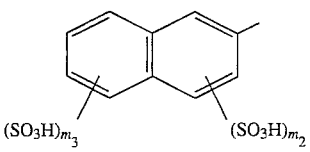  (12)

wherein $R_{12}$ is hydrogen, $C_1$–$C_4$ alkyl, $C_1$–$C_4$ alkoxy or carboxy; $m_1$ is 1 or 2; $m_2$ is 0 or 1; and $m_3$ is 1 or 2.

3. The compound according to claim 1, wherein A is a group represented by the formula (2).

4. The compound according to claim 1, wherein B is a group represented by the formula (3) in which $R_3$ is hydrogen or methyl and $R_4$ is hydrogen.

5. The compound according to claim 1, wherein R is hydrogen.

6. The compound according to claim 1, wherein Y is a group represented by the formula,

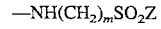

in which m is 2 or 3 and Z is as defined in claim 1.

7. The compound according to claim 1, wherein X is a group represented by the formula (9) in which $R_9$ and $R_{10}$ are independently hydrogen or $C_1$–$C_4$ alkyl unsubstituted or substituted with sulfo, sulfato, carboxy, hydroxy or $C_1$–$C_4$ alkoxy.

8. The compound according to claim 1, wherein X is a group represented by the formula (9) in which $R_9$ is hydrogen, methyl or ethyl, and $R_{10}$ is phenyl unsubstituted or substituted with one or two substituents selected from the group consisting of sulfo, chloro, bromo, carboxy, $C_1$–$C_4$ alkyl and $C_1$–$C_4$ alkoxy.

9. The compound according to claim 1, which is represented by the formula (II) in the free acid form,

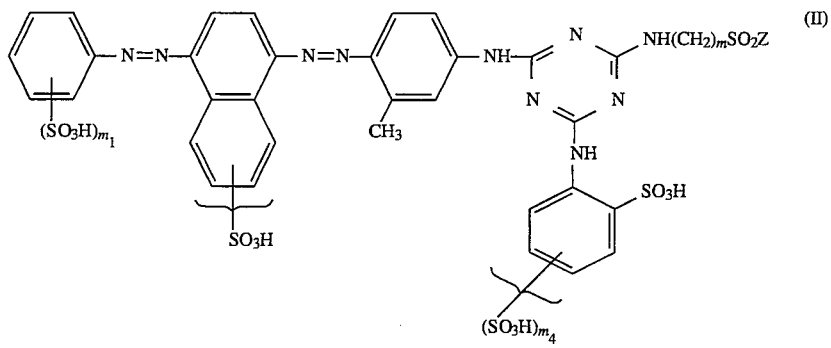

wherein $m_4$ is 0 or 1, $m_1$ is 1 or 2, m is 2 or 3, and Z is as defined in claim 1.

10. The compound according to claim 1, which is represented by the formula (III) in the free acid form,

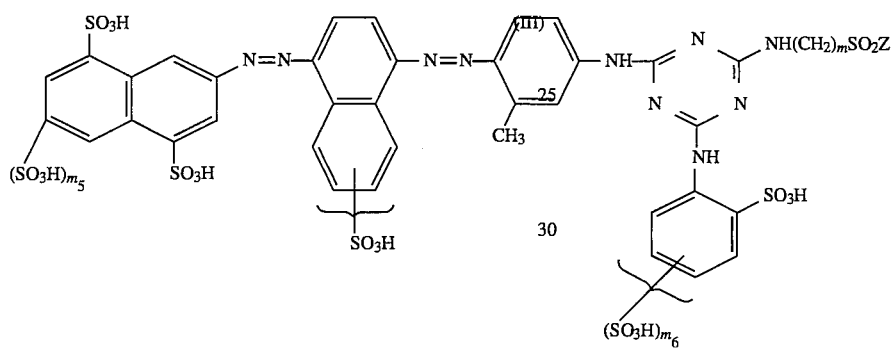

wherein $m_5$ and $m_6$ are independently 0 or 1, m is 2 or 3, and Z is as defined in claim 1.

11. The compound according to claim 1, wherein Z is $-CH=CH_2$, $-CH_2CH_2OSO_3H$ or $-CH_2CH_2Cl$.

12. A method for dyeing or printing fiber materials which comprises applying thereto the compound according to claim 1.

* * * * *